June 23, 1964
J. R. HANWAY
3,138,405
SAFETY BELT REEL
Filed Aug. 14, 1962
2 Sheets-Sheet 1
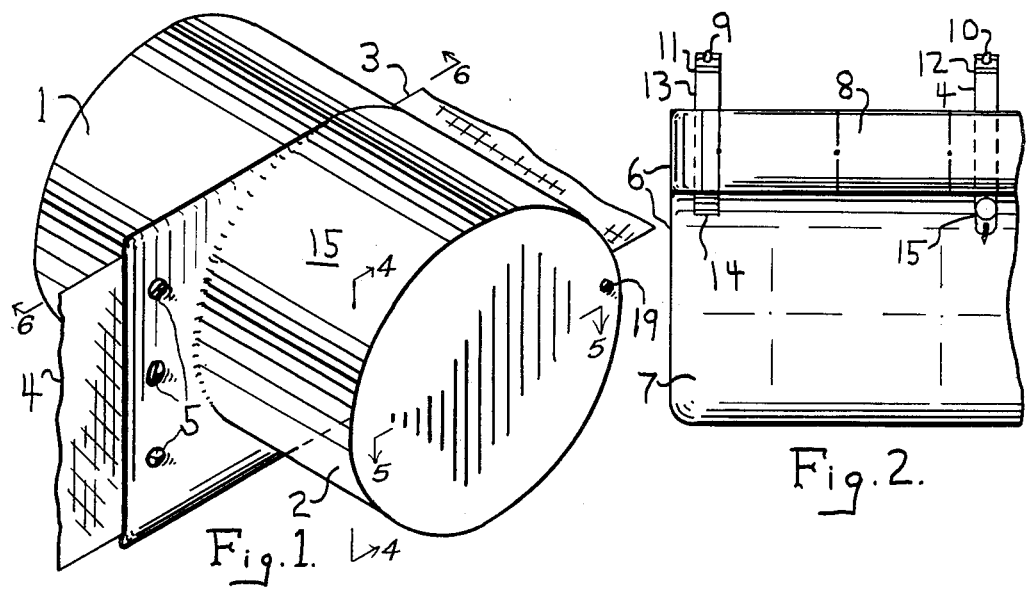
Fig.1.
Fig.2.
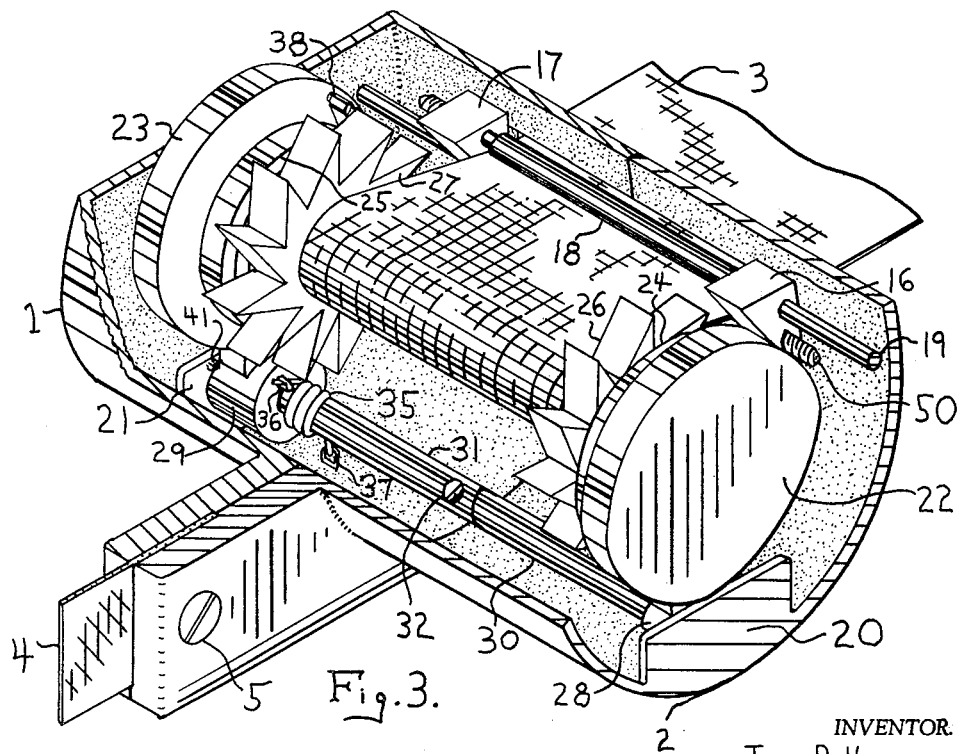
Fig.3.
INVENTOR.
JOHN R. HANWAY

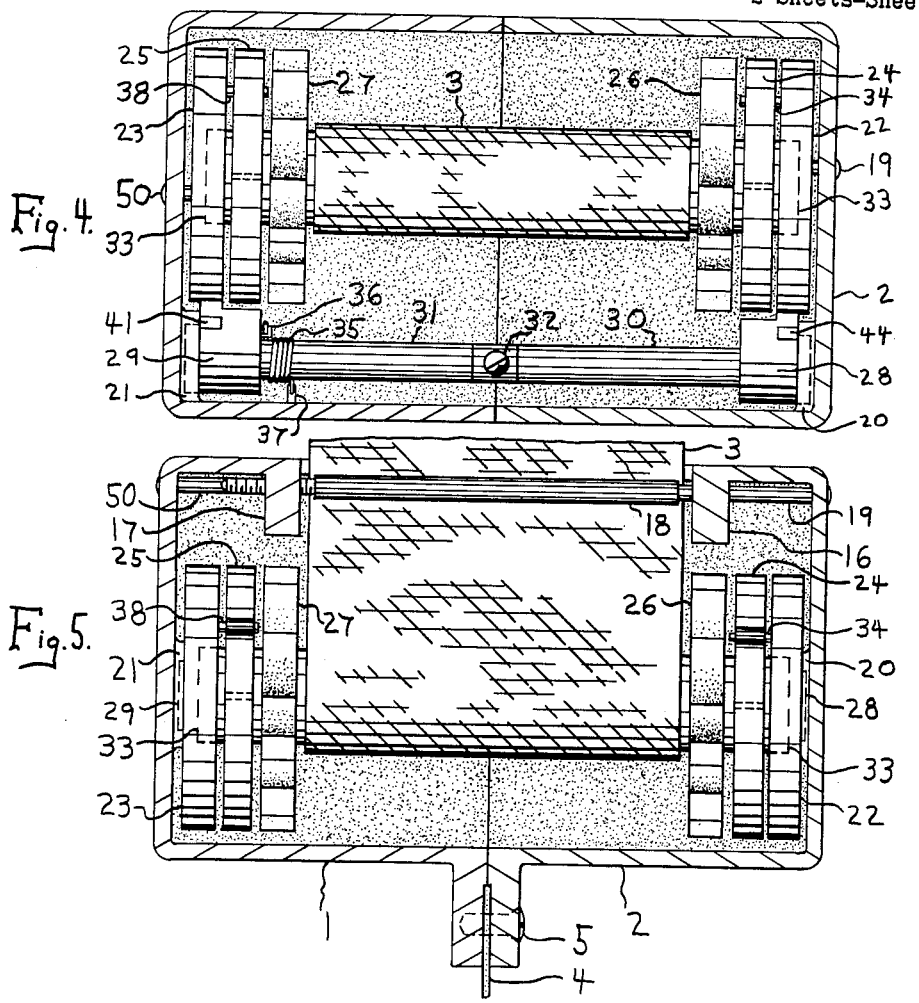
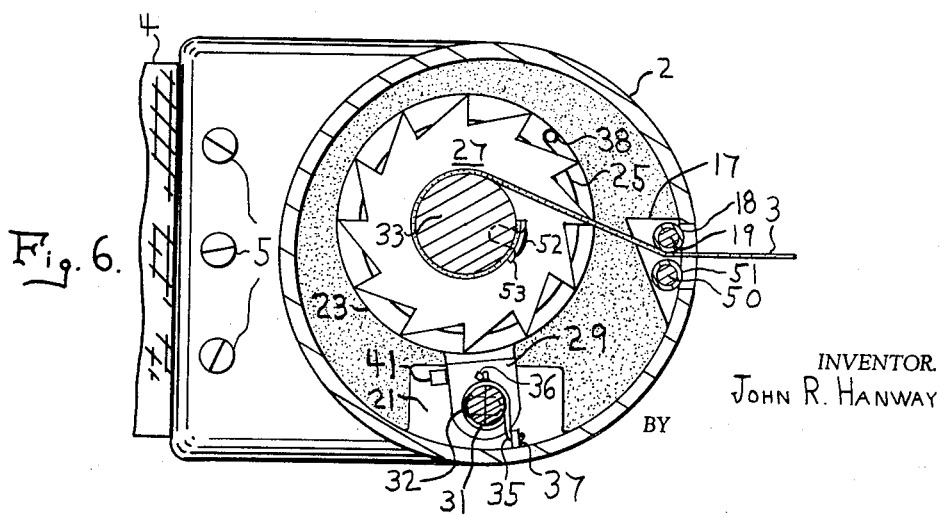

United States Patent Office 3,138,405
Patented June 23, 1964

3,138,405
SAFETY BELT REEL
John R. Hanway, 823 Vermont Ave., Fairmont, W. Va.
Filed Aug. 14, 1962, Ser. No. 216,824
5 Claims. (Cl. 297—386)

This invention relates to safety or seat belts which are used in airplanes, automotive vehicles and the like. This invention particularly concerns safety or seat belts which are retractable when not in use.

The traditional seat belt consists of two separate straps connected at one end to a firm part of the vehicle, usually beneath and behind seat, and a buckle or the like to connect the free ends of the straps together. The construction of the traditional seat belt makes it necessary for the free ends to lie on the seat when not in use in order that they may be fastened around the wearer with minimum inconvenience. The fact that these belts are lying on the seat makes entry and exit difficult. With the traditional seat belt, many times upon exit the belt slides from the seat and, in the case of an automotive vehicle, becames caught in a closing door, possibly damaging both vehicle and belt. It is an objective of this invention to provide a seat belt which is removed from the seat when not in use, yet being instantly available when needed.

The traditional seat belt, as well as some other retractable seat belts, incorporate large buckles for the purpose of connecting the straps across the wearer with means of adjusting and quickly releasing the belt when so desired. In many instances, the buckle rests on the wearer and in some cases is annoying and dangerous to proper steering if the wearer is driving the vehicle. It is therefore another objective of this invention to position the connecting buckle at the side of the wearer. As a consequence of this invention being a self-adjusting seat belt, the connecting buckle need only furnish a means to quickly connect and disconnect the belt, thus permitting the use of a less complicated and smaller buckle.

Installing traditional seat belts usually presents little problem, especially in the newer automobiles. However, former retractable seat belts many times required special consideration when installed in vehicles not especially built for their installation. This invention is connected in the same manner and at the same place as the traditional seat belt, therefore installation of this invention should present no problems.

When using the traditional seat belt, the wearer is restricted from moving or stretching appreciably, thus presenting a problem if the wearer need move or stretch. This invention is designed to allow free movement of the wearer when done slowly, such as leaning or stretching. To carry out the main purpose of a seat belt, this invention is designed so that a quick jerk or pull on the belt will yield the belt stationary; that is, in the case of an accident, the belt will not extend.

In accordance with the preceding objective, this invention, once installed, should be worn more often than a traditional belt because of greater comfort to the wearer, thus promoting safety.

FIG. 1 is a perspective view of the retracting mechanism of this invention.

FIG. 2 is a top plan view of a seat equipped with this invention showing the placement of the retracting mechanism.

FIG. 3 is a perspective view of the retracting mechanism of this invention with the housing cut-away.

FIG. 4 is a back elevational view of the section 4—4 as shown in FIG. 1 of the retracting mechanism.

FIG. 5 is a top plan view of the section 5—5 as shown in FIG. 1 of the retracting mechanism.

FIG. 6 is a side elevational view of the section 6—6 as shown in FIG. 1 of the retracting mechanism.

Referring now to the drawings, wherein similar reference numbers refer to similar parts, there is shown, in FIG. 1, the reel housings 1 and 2 from which strap 3 extends and strap 4 is fastened. The housings 1 and 2 are held together by the bolts 5, 19 and 50 which is not shown in FIG. 1.

In FIG. 2 the seat 6 consists of a cushion portion 7 and a back-rest 8. Beneath and behind the seat, there are two hooks, 9 and 10, to which adjustable buckles 11 and 12 are connected. From these two buckles, straps 4 and 13 extend up through the intersection of the two seat parts 7 and 8. The strap 13 is connected to the buckle 14 which is so constructed that it will not slip through the intersection of the seat elements 7 and 8.

In FIG. 3 the reel is displayed emphasizing its working parts. The strap 4 is connected to the reel 15 with bolts 5. The two halves of the housing 1 and 2 are constructed with the protruding parts 21, 17 and 20, 16 respectively. Parts 20 and 21 constitute a supporting means for the bracket composed of 22, 28, 30, 31, 29 and 23. Sections 28 and 29 of the bracket are circular and they are inserted into the parts 20 and 21 which have circular holes, thus permitting the rotation of the bracket with respect to the housings. The bracket, composed of two sections, is held together by the screw 32. Parts 22 and 23 of the bracket support the mechanism upon which the strap 3 is wound. Bolts 19 and 50 help hold the housings 1 and 2 together and are inserted at opposite ends of the reel. The sleeves 18 and 51 (FIG. 6) around the bolts 19 and 50 respectively furnish a friction reducing means for the movement of the belt through the opening in the reel. Parts 16 and 17 support the bolts 19 and 50 at opposite ends.

FIG. 4 and FIG. 5 affords a better view of the mechanism upon which the belts 3 is wound. A shaft 33 is held by bracket sections 22 and 23 in such a manner that the shaft 33 is free to rotate with respect to the sections 22 and 23. Parts 26 and 27 are integral parts of the shaft 33 and should, at time of manufacture, be made all in one piece. Parts 26 and 27 each take the form of a toothed wheel, also shown in FIG. 6. Parts 24 and 25 are flat springs used for the purpose of causing the shaft 33 to rotate and thus wind the strap 3. The springs 24 and 25 are fastened to the bracket sections 22 and 23 by the parts 34 and 38 respectively. The springs 24 and 25 are also connected to the shaft 33 in the slots provided. Part 35 is a spiral spring connected to the housing 1 with part 37 and to the bracket part 29 with part 36. The purpose of this spring is to furnish a resistance to the rotation of the bracket with respect to the housings 1 and 2.

Now referring to FIG. 6, the strap 3 is connected to the shaft 33 by screws 52 and backing plate 53. The spring 35 gives the bracket and thus the shaft 33 a tendency to rotate counter clockwise with respect to the housing 1, as shown in FIG. 6. However, stop 41 will prohibit rotation in a counter clockwise direction, by stopping bracket section 29. Therefore, spring 35 ultimately furnishes a resistance to the clockwise movement of the shaft 33 and associated parts. Because of the inherent moment of inertia of the shaft 33, but more important, the resistance offered by the flat springs 25 and 26, pulling of the strap 3 will tend to move the shaft 33 and the associated parts toward the protruding part of the case 17. When moved far enough, the part 17 will become engaged with a tooth on the part 27. Such engagement will prevent any rotation of the shaft, thus the strap 3 will not further extend from the housings 1 and 2. The resistance offered by the spring 35 tends to keep the parts 27 and 17 from approaching each other, thus permitting the strap 3 to unwind from the shaft 33 and extend from the housings 1 and 2. This fact makes the spring 35 the determining factor in whether the strap 3 can be pulled from the housings 1 and 2. In practical applications, the spring 35 will be of such specifications that the strap 3 will unwind from the shaft 33 when pulled slowly, but a fast pull or sudden jerk of the strap 3 would engage the mechanism and the belt would not extend. This action of this invention provides a seat belt with a gentle pull on the wearer, extending and contracting with the normal movements of the wearer, and offering a safety measure in the case of an accident.

Although this invention has been described in detail, modifications and variations in detail will occur to those skilled in the art and it is the intention this detailed description shall be taken as descriptive and illustrative, rather than limiting.

What is claimed is:

1. A safety belt mechanism comprising: a receptacle unit positioned near the intersection of the back and bottom of the seat; two straps attached to said receptacle unit; means to connect one of said straps to a sturdy anchor beneath and behind seat; a third strap; means to connect the second strap attached to said receptacle unit to said third strap; means to connect said third strap to a sturdy anchor beneath and behind seat; said receptacle unit comprising a housing; a two-piece, moveable bracket supported by said housing; said bracket having cylindrical projections adapted for connection to said housing in such a manner as to permit a rotational motion of said bracket with respect to said housing, said rotational motion being around an axis common with the axis of said cylindrical projections; said bracket having two cylindrical cavities with a common axis, said common axis of said cylindrical cavities being parallel but different than said common axis of said cylindrical projections; a cylindrically-ended shaft inserted into said cylindrical cavities and said second strap being wound upon said shaft and extending through an opening in said housing; resilient means restricting one direction and encouraging the other direction of rotation of said shaft axis around said common axis of said cylindrical projections; resilient means restricting free rotation of said shaft with respect to said bracket and said resilient means furnishing a torsional force effect on said shaft tending to wind said second strap upon said shaft; locking means preventing the movement of said second strap with respect to said housing when said second strap is being subjected to a force tending to pull said second strap from said housing, said force having a magnitude equal to or greater than a predetermined magnitude, said predetermined magnitude of force being substantially dependent on the demensions, frictional forces and resilient means of said receptacle unit where the said predetermined magnitude of force is of such a value as to permit the operation of said receptacle unit without locking when being used in the normal manner.

2. A safety belt mechanism as defined in claim 1 wherein said housing is constructed in such a manner as to make the angle of intersection of the two planes of the two said safety belt straps which are attached to said receptacle unit a right angle, thus permitting easy installation and effective winding action of said receptacle unit.

3. A safety belt mechanism as defined in claim 1 wherein said housing is constructed with two protruding teeth positioned in such a manner as to place them substantially within the path of travel of said shaft; wherein said shaft is constructed with two, toothed wheels capable of meshing with said protruding teeth, making rotation of said shaft impossible.

4. A safety belt mechanism as defined in claim 1 wherein said resilient means applied to said bracket consists of a coil spring, one end of said coil spring being attached to said housing and the other end of said coil spring being attached to said bracket; said coil spring being always torsionally compressed, thus constantly exerting a torsional force effect on said bracket.

5. A safety belt mechanism as defined in claim 1 wherein said resilient means applied to said shaft consists of flat, coil springs concentric with said shaft, one end of said flat springs being attached to said bracket and the other end attached to said shaft, said flat springs being always torsionally compressed, thus constantly exerting a torsional force effect on said shaft tending to rotate said shaft and wind said second safety belt strap thereon.

References Cited in the file of this patent

UNITED STATES PATENTS

| | | |
|---|---|---|
| 2,314,504 | Lifchultz | Mar. 23, 1943 |
| 2,708,555 | Heinemann et al. | May 17, 1955 |
| 2,825,581 | Knight | Mar. 4, 1958 |
| 2,898,976 | Barecki | Aug. 11, 1959 |
| 2,899,146 | Barecki | Aug. 11, 1959 |
| 2,953,315 | Lantier et al. | Sept. 20, 1960 |
| 3,074,761 | Ryan | Jan. 22, 1963 |